United States Patent [19]
Sugimoto

[11] Patent Number: 5,490,222
[45] Date of Patent: Feb. 6, 1996

[54] VIDEO SIGNAL PROCESSING APPARATUS FOR PROCESSING CORRELATIVE VIDEO SIGNALS OBTAINED FROM A PLURALITY OF IMAGING DEVICES

[75] Inventor: Hiroshi Sugimoto, Himeji, Japan

[73] Assignee: Mitsubishi Denki Kabushiki Kaisha, Tokyo, Japan

[21] Appl. No.: 475,102

[22] Filed: Jun. 7, 1995

Related U.S. Application Data

[63] Continuation of Ser. No. 193,579, Feb. 8, 1994, abandoned.

[30] Foreign Application Priority Data

Feb. 12, 1993  [JP]  Japan .................................. 5-024227

[51] Int. Cl.⁶ ........................................................ G06K 9/00
[52] U.S. Cl. ........................... 382/154; 382/168; 382/318
[58] Field of Search .................................. 382/106, 154, 382/168, 169, 274, 318; 348/47, 139; 356/12

[56] References Cited

U.S. PATENT DOCUMENTS

| | | | |
|---|---|---|---|
| 3,971,068 | 7/1976 | Gerhardt et al. | 358/82 |
| 4,791,678 | 12/1988 | Iwase et al. | 382/54 |
| 4,876,726 | 10/1989 | Capello et al. | 382/4 |
| 5,060,081 | 10/1991 | Shimura | 358/443 |
| 5,255,330 | 10/1993 | Huynh et al. | 382/18 |

FOREIGN PATENT DOCUMENTS

| | | | |
|---|---|---|---|
| 0467087 | 1/1992 | European Pat. Off. | 382/58 |
| 60-150183 | 8/1985 | Japan | 382/54 |
| 62-215270 | 9/1988 | Japan | H04N 5/243 |

OTHER PUBLICATIONS

Translation of Japanese Kokai No. 60–150183, published Aug. 1985.

*Primary Examiner*—Leo Boudreau
*Assistant Examiner*—Andrew W. Johns
*Attorney, Agent, or Firm*—Sughrue, Mion, Zinn, Macpeak & Seas

[57] ABSTRACT

A video signal processing apparatus is obtainable which is capable of automatically and continuously adjusting variations of characteristics due to various factors after each video signal input system is adjusted. Histogram extracting circuits for extracting density histograms Ha and Hb of first and second video signals Va and Vb within a predetermined period of time on the basis of first and second quantized data Da and Db, a deviation amount computing device for computing the deviation amount of the distribution of the density histogram of the second video signal with respect to that of the first video signal, and a correcting device for correcting the second quantized data on the basis of the deviation amount are provided, so that the variations between the density of the characteristics of the first video signal and that of the second video signal due to the variation between the characteristics of the first video signal input system and those of the second video signal input system are absorbed and automatically corrected.

15 Claims, 4 Drawing Sheets

VIDEO SIGNAL PROCESSING APPARATUS FOR PROCESSING CORRELATIVE VIDEO SIGNALS OBTAINED FROM A PLURALITY OF IMAGING DEVICES

This is a Continuation of application Ser. No. 08/193,579 filed Feb. 8, 1994, now abandoned.

BACKGROUND OF THE INVENTION

1. Field of the Invention

The present invention relates to a video signal processing apparatus for quantizing video signals obtained from a plurality of solid-state image pickup devices for picking up an originating image substantially from image one direction and inputting them to a video RAM, and for performing a correlation computing operation on video signals between different video signal input systems by using quantized data in the video RAM. More particularly, the present invention relates to a video signal processing apparatus capable of absorbing and correcting variations of video signal levels caused by discrete factors of each input system.

2. Description of the Related Art

Generally, a video signal processing apparatus for picking up images originating substantially from one direction by using a solid-state image pickup device of a plurality of video signal input systems and for performing a correlation computing operation on video signals of each system has been applied to various fields. For example, when the video signal processing apparatus is applied to a running car, it is possible to perform automatic running control by detecting a motor vehicle running in front of one's car to measure the distance between one's car and the car in front so that the distance can be set to a target safe distance.

In this type of video signal processing apparatus, to enhance the reliability of the correlation computing operation, it is preferable that the density distributions of video signals obtained from a plurality of video signal input systems be matched with each other so as to make the characteristics between the video signal input systems uniform.

FIG. 4 is a block diagram illustrating a conventional video signal processing apparatus formed of two video signal input systems. In this figure, reference numerals 11a and 11b respectively denote first and second video signal input systems (hereinafter simply referred to as video signal input systems). As each of them has the same construction, only the block construction within one of the video signal input systems, 11a, is shown. Therefore, though not shown here, the other video signal input system 11b is assumed to be formed of elements designated by reference numerals 1b to 9b.

Reference numeral 1a denotes an optical system; reference numeral 2a denotes a solid-state image pickup element for photoelectrically converting an image picked up by the optical system 1a; reference numeral 3a denotes an amplifying circuit for amplifying charges discharged from the solid-state image pickup element 2a; reference numeral 4a denotes a solid-state image pickup device formed of the solid-state image pickup element 2a and the amplifying circuit 3a.

Reference numeral 5a denotes an amplifying circuit for amplifying a composite signal (a video signal including a synchronization signal), i.e., a video signal Va, output from the solid-state image pickup device 4a, to an AD conversion level; reference numeral 6a denotes a filter circuit for preventing folding strain at sampling time during AD conversion; reference numeral 7a denotes a clamping circuit for clamping the pedestal level of the video signal Va; reference numeral 8a denotes an AD conversion circuit for converting the video signal Va via the clamping circuit 7a into quantized data Da; and reference numeral 9a denotes a video RAM for inputting and storing the quantized data Da.

Reference numeral 10 denotes a video signal processing section for inputting quantized data Da and Db from the video RAM of the video signal input systems 11a and 11b, which section performs various computing operations such as a correlation computing operation between the quantized data Da and Db. A result C of the computing operation by the video signal processing section 10 is output to an external apparatus (not shown) as required.

As described above, to enhance the reliability of the result C of the computing operation of the video signal processing section 10, an automatic aperture control, for example, is applied to the optical system 1a, and characteristics output between the video signal processing apparatuses are made uniform by an AGC (Automatic Gain Control) circuit within the amplifying circuit 3a inside the solid-state image pickup device 4a of one of the video signal input system, 11a.

Further, the optical system 1a inside the video signal input system 11a is provided with an AGC function, or the level matching of each video signal Va is performed by manual gain control, so that characteristics variations between the video signal input systems 11a and 11b are reduced so as to suppress as much as possible an influence upon a correlation operation between the video signal input systems 11a and 11b caused by hardware.

Next, a description will be given of the operation of the conventional video signal processing apparatus shown in FIG. 4 by referring to one of the video signal input systems, 11a.

Initially, an image formed in the solid-state image pickup element 2a by an optical system 1 is amplified by the amplifying circuit 3a, and then output from the solid-state image pickup device 4a as the video signal Va. Further, the video signal Va is amplified by the amplifying circuit 5a, and then input through the filter circuit 6a and the clamping circuit 7a to the AD conversion circuit 8a.

The AD conversion circuit 8a converts the video signal Va into quantized data Da and stores it in the video RAM 9a. The quantized data Da in the video RAM 9a, together with the other quantized data Db, is input to the video signal processing section 10 were a correlation computing operation is performed, such as the computing operation result C indicating a distance up to an object is output to an external apparatus.

The conventional video signal processing apparatus, as described above, performs uniform adjustment control for each of the video signal input systems 11a and 11b in order to make the variations of the characteristics between the video signal input systems 11a and 11b uniform, and performs a correlation computing operation between the video signals Va and Vb of a plurality of video signal input systems. Therefore, problems arise, for example in that there is a need at a final stage to perform manual fine adjustments. Also deviations occur even after such fine adjustments are made, due to temperature and component aging, as a result of which a computing operation result C having high reliability cannot be obtained.

SUMMARY OF THE INVENTION

The present invention has been achieved to solve the above-described problems of the prior art. An object of the present invention is to provide a video signal processing apparatus capable of continuously and automatically adjusting variations of characteristics arising from various post-adjustment factors after adjustments by using the video signals of one system as a reference, and making the characteristics of the video signals of another system match those of the reference video signals.

A video signal processing apparatus in accordance with a first aspect of the present invention comprises:

a first video signal input system comprising a solid-state image pickup device, including an optical system and a solid-state image pickup element, for generating a first video signal, an AD conversion circuit for converting the first video signal into first quantized data Da, and a video RAM for inputting the first quantized data Da;

a second video signal input system, having the same construction as that of the first video signal input system, for inputting second quantized data on an image in one direction, which image is in the same direction as that in the first video signal input system;

a video signal processing section for reading the first and second quantized data from the first and second video signal input systems;

a histogram extracting circuit for extracting a density histogram of the first and second video signals within a predetermined period of time on the basis of the first and second quantized data;

a deviation amount computing means for computing the deviation amount of the distribution of the density histogram of the second video signal from that of the first video signal; and correcting means for correcting the second quantized data on the basis of the deviation amount, and wherein density variations of the first and second video signals due to characteristics variations between the first and second video signal input systems are absorbed to automatically correct the characteristics variations.

In addition to the construction disclosed in claim 1, a video signal processing apparatus in accordance with a second aspect of the present invention comprises abnormality determining means for generating an error signal indicating at least one of the first and second video signal input systems when the deviation amount of the density histogram is larger than a predetermined value.

In addition to the construction disclosed in either claim 1 or 2, a video signal processing apparatus in accordance with a third aspect of the present invention comprises extraction period-of-time setting means for setting a predetermined period of time required to extract the density histogram in accordance with image pickup conditions.

In the first aspect of the present invention, an automatic correcting function for making the characteristics between the video signal systems uniform is provided, and the density histogram of a first video signal within a predetermined period of time is compared with that of a second video signal which should follow the first video signal in the same period of time in the quantized data of the first video signal which is used as a reference so that the deviation amount of the distribution of the density histogram is extracted. This deviation amount is fed back to the second quantized data, and the second quantized data added as a correction constant is stored in the video RAM.

In the second aspect of the present invention, when the shape of the density histogram of the first video signal is considerably different from that of the second video signal and the correction thereof is impossible, it is determined that a malfunction occurred at least in one of the first and second video signal input systems. A warning is issued using an error signal, nullifying the result of the correlation computing operation and notifying a failure of the video signal input system.

In the third aspect of the present invention, by setting a time to extract the density histogram of video signals as desired, it is possible to enhance the reliability of the result of the comparison of the density histograms and flexibly cope with changes in the image pickup conditions.

DESCRIPTION OF THE PREFERRED EMBODIMENTS

Preferred embodiments of the present invention will be explained below with reference to the accompanying drawings.

First Embodiment

Figure 1:
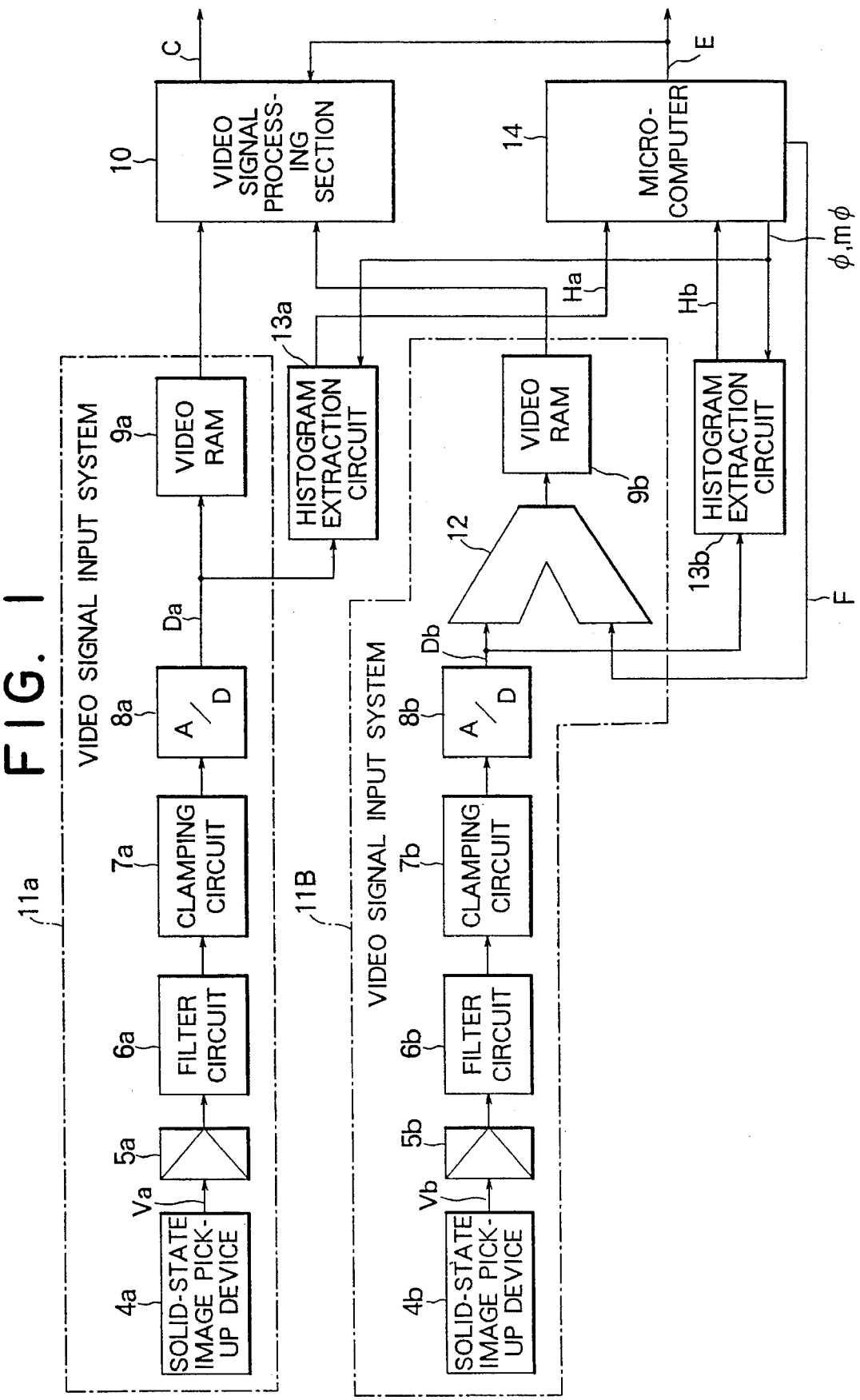
FIG. 1 is a block diagram schematically illustrating the construction of a first embodiment of the present invention.

FIG. 1 is a block diagram schematically illustrating the construction of the first embodiment of the present invention having a video signal correction function, which also illustrates a case in which two solid-state image pickup devices are used side by side, as described earlier.

Figure 4:
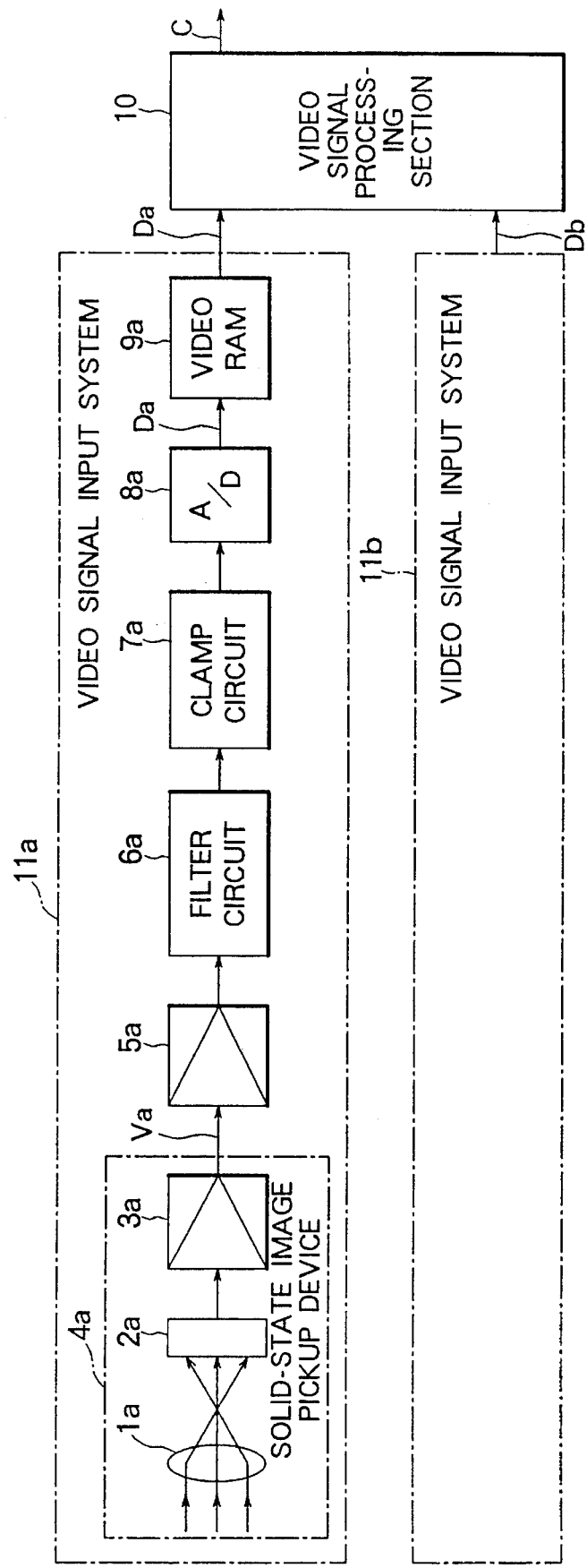
FIG. 4 is a block diagram schematically illustrating the construction of a conventional video signal processing apparatus.

In this figure, reference numeral 11B corresponds to the video signal input system 11b in FIG. 4, and reference numerals 1a to 9a, 11a, 2a to 9b are the same as those described earlier. In this embodiment, the video signal input system 11a is assumed to be on a reference side, and the video signal input system 11B is assumed to be on a follower side.

Reference numeral 12 denotes a correction addition circuit provided between the AD conversion circuit 8b and the video RAM 9b inside the video signal input system 11B; reference numeral 13a denotes a histogram extracting circuit for or extracting a density histogram Ha of the video signal Va within a predetermined period of time T (described later) on the basis of the quantized data Da obtained from the AD conversion circuit 8a; and reference numeral 13b denotes a histogram extracting circuit for extracting a density histogram Hb of the video signal Vb within a predetermined period of time T on the basis of the quantized data Db obtained from the AD conversion circuit 8b.

A correction addition circuit 12 constitutes correction addition means for correcting the second quantized data Db and storing it in the video RAM 9b.

Reference numeral 14 denotes a microcomputer for comparing each density histogram Ha with each density histogram Hb and generating a correction signal F, and feeding back the correction signal F to the correction addition circuit 12. The microcomputer 14 outputs clock signals $\phi$ and $m\phi$ of a predetermined cycle for setting the predetermined period of time T for histogram extraction to histogram extracting circuits 13a and 13b, and an error signal E, to the video signal processing section 10 as required when the result of the comparison of the density histograms Ha and Hb indicates an abnormality.

Figure 2:
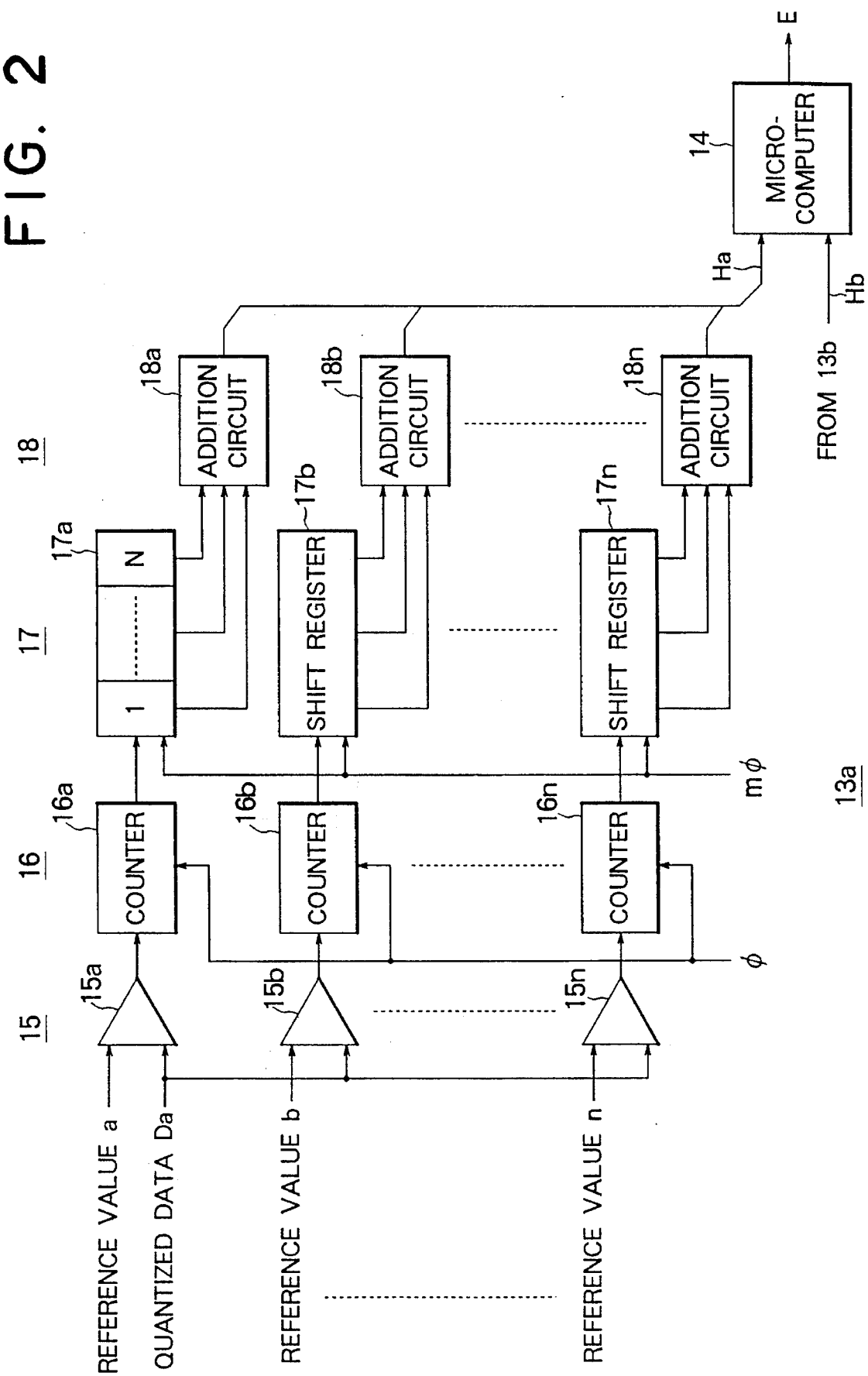
FIG. 2 is a block diagram schematically illustrating the construction of a histogram extracting circuit in FIG. 1.

FIG. 2 is a block diagram schematically illustrating the construction of a histogram extracting circuit 13a in FIG. 1. Since it is the same as the histogram extracting circuit 13b, an explanation thereof is omitted.

Reference numeral 15 denotes a level comparing circuit for separating the quantized data Da for each density, which is formed of n level comparing circuits 15a to 15n respectively corresponding to reference values "a" to "n". Reference numeral 16 denotes a counter for counting the number of times each density separated by the level comparing circuit 15 appears, which counter is formed of n counters 16a to 16n in the same manner as the level comparing circuit 15. The counter operates by the clock signal $\phi$ the same predetermined cycle as that of the sampling clock of the quantized data Da.

Reference numeral 17 denotes a shift register for inputting the count value of each of the counters 16a to 16n, which shift register is formed of n shift registers 17a to 17n in the same manner as he counter 16 and operate by the clock signal m$\phi$ having a cycle m times more than that of the clock signal $\phi$. The variable m of the clock signal m$\phi$ indicates the clock rate of the counter 16. Each of the shift registers 17a to 17n is formed of N bits along the time axis.

Reference numeral 18 denotes an addition circuit for respectively adding the parallel output from the shift register 17, corresponding to each density data value within the predetermined period of time T, which register is formed of n addition circuits 18a to 18n in the same manner as the shift register 17, the result of the addition of each of the addition circuits 18a to 18n being input to the microcomputer 14 as the density histogram Ha.

Figure 3:
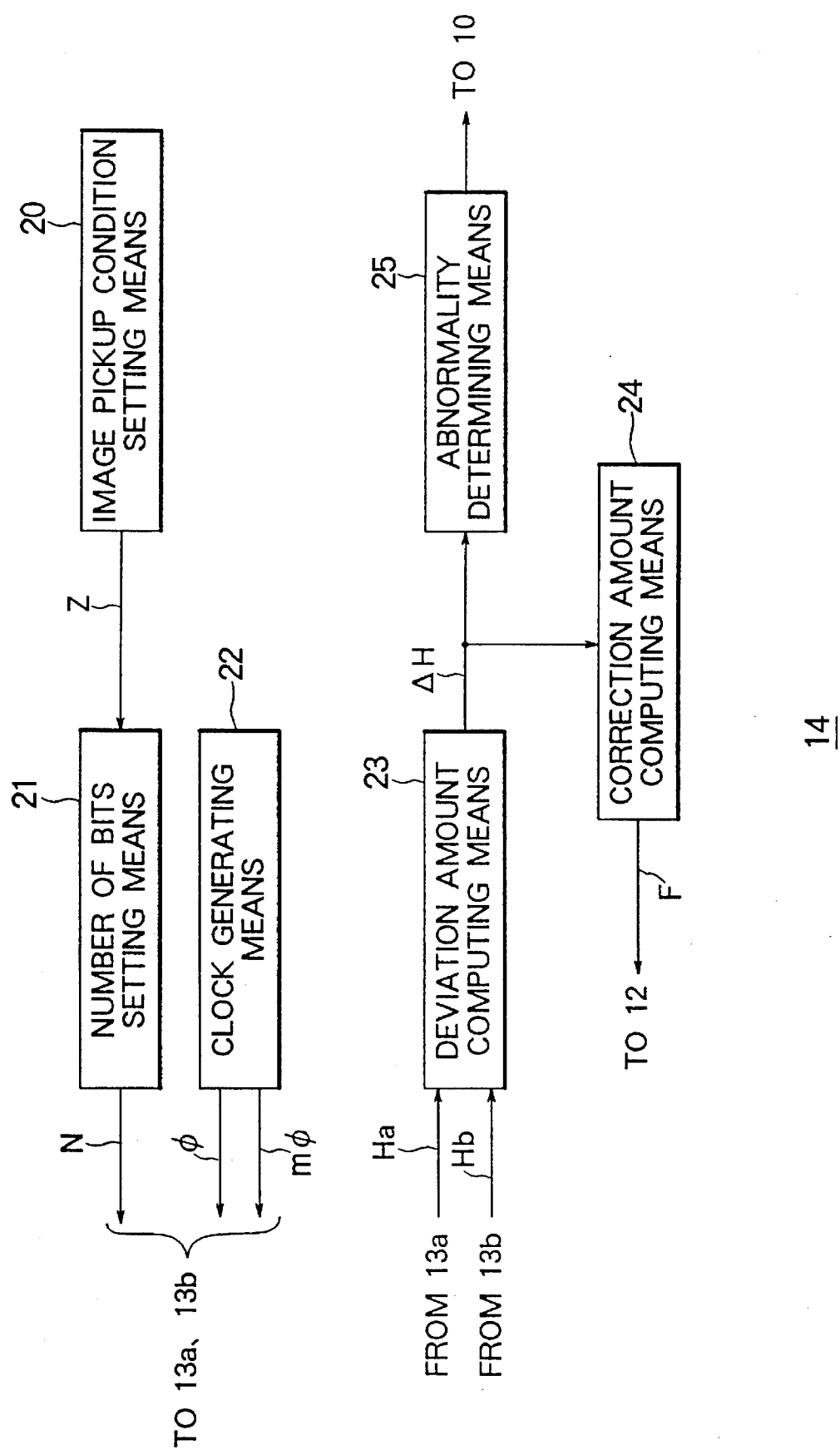
FIG. 3 is a block diagram schematically illustrating the construction of a microcomputer in FIG. 1.

FIG. 3 is a block diagram illustrating the functional units of the microcomputer. Reference numeral 20 denotes an image pickup condition setting means for setting various image pickup conditions Z on the basis of an external input (not shown) or the like; reference numeral 21 denotes the number of bits setting means for setting the number of bits N along the time axis in the shift register 17 and the addition circuit 18 according to the image pickup conditions Z; and reference numeral 22 denotes a clock generating means for outputting clock signals $\phi$ and m$\phi$ to histogram extracting circuits 13a and 13b. The image pickup condition setting means 20 and the number of bits setting means 21 constitute an extraction period of time setting means for setting the predetermined period of time T required to extract the density histograms Ha and Hb.

Reference numeral 23 denotes a deviation amount computing means for comparing the density histogram Ha from the histogram extracting circuit 13a with the density histogram Hb from the histogram extracting circuit 13b and for computing the distribution deviation between them as a deviation amount $\Delta H$; reference numeral 24 denotes a correction amount computing means for computing the correction signal F for the correction addition circuit 12 on the basis of the deviation amount $\Delta H$, this amount capable of being used as it is as the correction signal F; reference numeral 25 denotes an abnormality determining means for determining the abnormality of the deviation amount a $\Delta H$, and generating an error signal E indicating the abnormality of at least either of the video signal input systems 11a or 11b when the deviation amount $\Delta H$ is larger than a predetermined value, the error signal E being input to an external warning apparatus (not shown) and the video signal processing section 10, and to a deviation amount computing means 23 as required.

Next, the operation of the first embodiment of the present invention will be explained with reference to FIGS. 1 to 3.

In the same way as described above, a target image is picked up by the solid-state image pickup devices 4a and 4b and becomes video signals Va and Vb, respectively. The video signals Va and Vb are amplified by amplifying circuits 5a and 5b; are subjected to pre-processing by filter circuits 6a and 6b and clamping circuits 7a and 7b, become quantized data by AD conversion circuits 8a and 8b; and are stored in video RAMs 9a and 9b, respectively.

The video signal processing section 10 reads out quantized data Da and Db from the video RAMs 9a and 9b, respectively, and performs a correlation computing operation continuously in real time.

Parallel to this operation, the histogram extracting circuits 13a and 13b extract density histograms Ha and Hb of the video signals Va and Vb within the predetermined period of time T on the basis of the quantized data Da and Db, respectively.

Generally, the density histograms Ha and Hb of the video signals Va and Vb of the same image assume substantially the same shape within a certain sufficient period of time, but it is known that these histograms vary in density due to characteristics variations between the video signal input system 11a and 11B.

Therefore, in the microcomputer 14, a deviation amount computing means 23 computes the deviation amount $\Delta H$ of the second density histogram Hb from the density histogram Ha of the first video signal Va in density. A correction amount computing means 24 continuously corrects the quantized data Db by feeding back the correction signal F based on the deviation amount $\Delta H$ to the correction addition circuit 12.

A concrete operation of the histogram extracting circuit 13a shown in FIG. 2 will now be explained.

Initially, the level comparing circuit 15 separates the quantized data Da of the video signal Va for each density according to the reference values "a" to "n". Using the clock signal $\phi$ of the same cycle as that of a quantized sampling clock, the counter 16 counts the number of times each density of the quantized data Da appears.

Then, the shift registers 17a to 17n input the count values of the counters 76a to 16n for each density by a clock signal m$\phi$ m times that of the clock signal $\phi$, and this operation is continuously repeated. Finally, addition circuits 18a to 18n add parallel output for N bits from the shift registers 17a to 17n, and the continuous density histogram Ha representing the predetermined period of time T from the present time back to the beginning of time T is obtained.

The predetermined period of time T, during which the density histograms Ha and Hb are extracted, is determined by the clock signal m$\phi$ corresponding to a cycle m times the clock rate of the counter 16 and by the number of bits N along the time axis of the shift register 17, and can be expressed as follows:

$$T = m\phi \times N \qquad (1)$$

In equation (1), by variably controlling the variable m of the clock signal m$\phi$ and the number of bits N of the shift register 17, the histogram extraction time T is controlled. Since the clock signal $\phi$ has been determined on the basis of the quantization sampling period, it is a constant value and cannot be variably set as desired. It is clear, however, that the number of bits N of output data from the shift register 17 added by an addition circuit 18, can be controlled by the number of bits setting signal N from the number of bits setting means 21 within the microcomputer 14. Therefore, the extraction time T can be controlled over a wide range in units of a clock rate, i.e., the clock signal φ based on the variable m, and in units of the clock signal mφ based on the number of bits N, respectively.

Therefore, the number of bits setting means 21 sets the number of bits N according to the image pickup conditions Z, and sets the number of output bits N or the number of addition bits N in the shift register 17 or in the addition circuit 18, in order to set the predetermined period of time T as desired and to optimize with respect to a subject image to be picked up, an image pickup environment or the like.

In this way, the histogram extracting circuits 13a and 13b input the density histograms Ha and Hb which are continuously detected by the clock signal mφ to the microcomputer 14.

The deviation amount computing means 23 inside the microcomputer 14 computes the deviation amount ΔH in the density distribution of the density histograms Ha and Hb, and this is determined to be the correction signal F by the correction amount computing means 24. Then, the deviation amount computing means 23 applies a feedback control to the correction addition circuit 12 inside the follower-side system 11B.

That is, by determining, for example, the video signal input system 11a to be a reference-side system from among the video signal input systems 11a and 11B, the relative deviation amount ΔH in density in the density histogram Hb of the follower-side system 11B is determined. This amount is added to the quantized data Db of the follower-side system 11B as the correction signal F, making it possible to bring it in agreement with the follower-side system 11B.

The corrected density histogram Hb is stored in the video RAM 9b as data of the video signal Vb of the follower-side system 11B.

By repeatedly performing the above operation, it becomes easier to match the characteristics of the video signals Va and Vb of the two systems, and to minimize the deviation amount ΔH after adjustments. Therefore, it is possible to automatically absorb density variations of the video signals Va and Vb and to correct them to become uniform without performing adjustments.

The subsequent correlation computing operation of the quantized data Da and Db in the video signal processing section 10 is not affected by characteristics variations of the video signal input system (the optical system 1 which inputs an image to the quantization processing circuit, i.e., the AD conversion circuit 8).

When comparing the density histogram Ha with the density histogram Hb, the abnormality determining means 25 inside the microcomputer 14 compares the deviation amount ΔH with the predetermined value which has previously been set as an abnormality determination reference. When their density distributions differ to such an extent that the deviation amount ΔH becomes larger than the predetermined value, the correction of the quantized data Db is determined to be useless.

When this condition occurs, an error signal E indicating that at least one of the video signal input systems 11a and 11B has a malfunction is created and input to the correlation computing operation section inside the video signal processing section 10 to notify it of the nullity of the density histograms Ha and Hb and is output to an external warning apparatus or the like. As a result, the correlation computing operation is interrupted and it is possible to notify a driver of an occurrence of a malfunction by the warning apparatus.

Second Embodiment

Although in the above-described first embodiment the microcomputer 14 has the abnormality determining means 25 so that the error signal E is created when it is determined that a malfunction occurs, the abnormality determining means 25 may be omitted when the reliability of the video signal input systems 11a and 11B is high.

Third Embodiment

Although in the above-described first embodiment the microcomputer 14 has the number of bits setting means 21 so as to make it possible to vary the number of bits N according to the image pickup conditions Z, when the changes in the image pickup conditions Z are small, the image pickup condition determining means 20 and the number of bits setting means 21 may be omitted.

Fourth Embodiment

Although the above-described first embodiment describes a case in which the two video signal input systems 11a and 11B are used, a desired number of follower-side systems having the same construction as that of the video signal input system 11B may be disposed, and if the microcomputer 14 parallelly processes the follower-side systems, it is possible to realize a video signal processing apparatus capable of tracking a single reference-side system similarly to that described above even if three systems are provided.

Fifth Embodiment

Although an example has been described in which the present invention is applied to measuring the distance between one's car and a car running ahead of it, needless to say, any video signal processing apparatus using a plurality of systems of the solid-state image pickup device 4 can be applied to any other applications.

As described above, according to a first aspect of the present invention, there is provided a video signal processing apparatus comprising:

a first video signal input system comprising a solid-state image pickup device, including an optical system and a solid-state image pickup element, for generating a first video signal, an AD conversion circuit for converting the first video signal into first quantized data Da, and a video RAM for inputting the first quantized data Da;

a second video signal input system, having the same construction as that of the first video signal input system, for inputting second quantized data on an image in one direction, which image is in the same direction as that in the first video signal input system;

a video signal processing section for reading the first and second quantized data from the first and second video signal input systems;

a histogram extracting circuit for extracting a density histogram of each of the first and second video signals within a predetermined period of time on the basis of the first and second quantized data;

a deviation amount computing means for computing the deviation amount of the distribution of the density histogram of the second video signal from that of the first video signal; and correcting means for correcting the second quantized data on the basis of the deviation amount, so that density variations of the first and second video signals due to characteristics variations between the first and second video signal input systems are absorbed to automatically correct the characteristics variations. Thus, there is the advantage that a video signal processing apparatus can be obtained which is capable of continuously and automatically adjusting characteristics variations due to various factors after adjustments and preventing a wasteful correlation computing operation from being performed when a malfunction occurs.

In addition to the construction disclose in claim 1, according to a second aspect of the present invention, there is provided an abnormality determining means for generating an error signal indicating a malfunction of at least one of the first and second video signal input systems when the deviation amount of the density histogram is larger than a predetermined value, so as to give notice that the result of the correlation computing operation has been nullified and a failure of the video signal input system has occurred. Thus, there is the advantage that a video signal processing apparatus can be obtained which is capable of continuously and automatically adjusting characteristics variations due to various factors after adjustments and preventing a wasteful correlation computing operation from being performed when a malfunction occurs.

In addition to the construction disclosed in either claim 1 or 2, according to a third aspect of the present invention, there is provided an extraction period-of-time setting means for setting a predetermined period of time required to extract the density histograms according to image pickup conditions so as to make it possible to set the most appropriate extraction period of time. Thus, there is the advantage that a video signal processing apparatus can be obtained which is capable of continuously and automatically adjusting characteristics variations due to various factors after adjustments, thus enhancing the reliability of the result of the comparison of the distribution of the density histograms, and allowing changes in the image pickup conditions to be flexibly coped with.

What is claimed is:

1. A video signal processing apparatus comprising:

a first video signal input system comprising a solid-state image pickup device, including an optical system and a solid-state image pickup element, for generating a first video signal of a first image, an A/D conversion circuit for converting said first video signal into first quantized data, and a video RAM for inputting said first quantized data;

a second video signal input system comprising a solid-state image pickup device, including an optical system and a solid-state image pickup element, for generating a second video signal, an A/D conversion circuit for converting said second video signal into second quantized data, a correction addition means for adding correction data to said second quantized data and outputting corrected quantized data, and a video RAM for inputting said corrected quantized data, which second image originates substantially from the same direction as the first image recorded in the first video signal input system;

a video signal processing section for reading said first quantized data and said corrected quantized data from said first and second video signal input systems;

histogram extracting circuitry for extracting a density histogram of each of said first and second video signals within a predetermined period of time on the basis of said first and second quantized data;

a deviation amount computing means for computing a deviation amount of a distribution of the density histogram of said second video signal from that of said first video signal; and means for correcting said second quantized data by calculating said correction data on the basis of said deviation amount and for outputting said correction data to said correction addition means, wherein density variations of said first and second video signals due to characteristics variations between said first and second video signal input systems are absorbed to automatically correct the characteristics variations.

2. A video signal processing apparatus according to claim 1, further comprising abnormality determining means for generating an error signal indicating an abnormality of at least one of said first and second video signal input systems when the deviation amount of said density histogram is larger than a predetermined value.

3. A video signal processing apparatus according to claim 1, further comprising extraction period-of-time setting means for setting a predetermined period of time required to extract said density histogram in accordance with image pickup conditions.

4. A video signal processing apparatus according to claim 3, further comprising abnormality determining means for generating an error signal indicating an abnormality of at least one of said first and second video signal input systems when the deviation amount of said density histogram is larger than a predetermined value.

5. A video signal processing system for processing correlated video signals comprising:

a first imaging device and a second imaging device, said imaging devices being separated by a predetermined distance and oriented to obtain a first video image signal and a second video image signal, respectively, of substantially the same subject at substantially the same time;

said first imaging device comprising a first video signal input system for quantizing first data from the first video image signal into a first video RAM;

said second imaging device comprising a second video signal input system for quantizing second data from the second video image signal into a second video RAM;

a video signal processing section for reading said first and second quantized data obtained from said first and second video RAM;

a deviation amount computing means for computing a deviation amount between said second video signal mid said first video signal; and a correction addition circuit for correcting said second quantized data on the basis of said deviation amount, wherein said deviation computing means comprises a first and a second histogram extracting circuit for extracting, respectively, a density histogram of each of said first and second video signals within a predetermined period of time on the basis of said first and second quantized data.

6. A video signal processing system according to claim 5, wherein:

said first video signal pickup system comprises a solid-state image pickup device, including an optical system and a solid-state image pickup element, for generating a first video signal, and an A/D conversion circuit for converting said first video signal into said first quantized data; and said second video signal pickup system comprises a solid-state image pickup device, including an optical system and a solid-state image pickup element, for generating a first video signal, and an A/D conversion circuit for converting said first video signal into said second quantized data.

7. A video signal processing system according to claim 5, wherein:

said correction addition circuit corrects for density variations of said first and second video signals due to characteristics variations between said first and second video signal input systems, thereby automatically correcting the characteristics variations.

8. A video signal processing system according to claim 5, further comprising abnormality determining means for generating an error signal indicating an abnormality of at least one of said first and second video signal input systems when said deviation amount is larger than a predetermined value.

9. A video signal processing system according to claim 5, further comprising extraction period-of-time setting means for setting a predetermined period of time required to extract said density histograms in accordance with image pickup conditions.

10. A video signal processing system according to claim 9, further comprising abnormality determining means for generating an error signal indicating an abnormality of at least one of said first and second video signal input systems when said deviation amount is larger than a predetermined value.

11. A method for adjusting variations in video signals obtained from a plurality of imaging devices, comprising the steps of:

orienting and operating said imaging devices to obtain substantially simultaneous images of substantially the same subject, inputting and quantizing a first video image from a first of said imaging devices into a first video signal input system as first quantized data;

inputting and quantizing a second video image from a second of said imaging devices into a second video signal input system as second quantized data;

extracting a first and a second density histogram from each of the first and second quantized data, respectively;

computing a deviation amount of the distribution of the density histogram of the second quantized data from that of the first quantized data; and correcting the second quantized data on the basis of the computed deviation amount.

12. A method for adjusting variations in video signals obtained from a plurality of imaging devices according to claim 11, wherein said correcting step comprises:

adding a characteristic variation, obtained from the computed deviation amount, to the second quantized data in the second video signal input system.

13. A method for adjusting variations in video signals obtained from a plurality of imaging devices according to claim 11, wherein the second quantized data is corrected after the data is converted from an analog signal to a digital signal and before the data is stored in a video RAM.

14. A method for adjusting variations in video signals obtained from a plurality of imaging devices according to claim 11, further comprising the step of generating an error signal indicating an abnormality of at least one of the first and second video input systems when the deviation amount is larger than a predetermined value.

15. A method for adjusting variations in video signals obtained from a plurality of imaging devices according to claim 11, further comprising the step of processing the first quantized data and the second, corrected quantized data.

* * * * *